United States Patent [19]

Kinnear et al.

[11] Patent Number: 5,155,995
[45] Date of Patent: Oct. 20, 1992

[54] CATALYTIC CONVERTER PREHEATING SYSTEM

[75] Inventors: James W. Kinnear; Isidoro N. Baccarini, both of White Plains, N.Y.

[73] Assignee: Texaco Inc., White Plains, N.Y.

[21] Appl. No.: 653,215

[22] Filed: Feb. 5, 1991

[51] Int. Cl.$^5$ ............................................. F01N 3/28
[52] U.S. Cl. ..................................... 60/300; 60/284; 123/179.2
[58] Field of Search ...................... 60/300, 284, 274; 422/174; 123/179.2

[56] References Cited

U.S. PATENT DOCUMENTS

| | | | |
|---|---|---|---|
| 3,455,403 | 7/1969 | Hawthorne | 123/179.2 |
| 3,775,064 | 11/1973 | Berger | 60/300 |
| 3,886,739 | 6/1975 | Lee | 60/300 |
| 3,910,042 | 10/1975 | Yuge | 60/300 |
| 4,102,127 | 7/1978 | Saiki | 60/300 |
| 4,227,588 | 10/1980 | Biancardi | 123/179.2 |
| 4,674,454 | 6/1987 | Phairr | 123/179.2 |

FOREIGN PATENT DOCUMENTS

| | | | |
|---|---|---|---|
| 2062500 | 6/1972 | Fed. Rep. of Germany | 60/284 |
| 2233793 | 1/1974 | Fed. Rep. of Germany | 60/300 |
| 1308736 | 10/1962 | France | 60/284 |

*Primary Examiner*—Douglas Hart
*Attorney, Agent, or Firm*—Robert A. Kulason; James J. O'Loughlin; Robert B. Burns

[57] ABSTRACT

In a vehicle having an internal combustion engine including an ignition system and an exhaust system, a catalytic converter in the latter contacts hot exhaust gases to treat them prior to their discharge into the atmosphere. An electrically energized heater in close association with the converter preheats the catalyst bed in preparation for contacting the hot exhaust gas stream. Preheating, prior to starting the engine, is triggered by a mobile transmitter calibrated to transmit on one or more radio frequencies to accomplish the necessary degree of catalyst heating until the latter is at suitable temperature for treating exhaust gas. Thereafter the electric heating is discontinued in favor of further catalyst heating by contact with the hot exhaust gas.

10 Claims, 2 Drawing Sheets

CATALYTIC CONVERTER PREHEATING SYSTEM

BACKGROUND OF THE INVENTION

The startup of engines fueled by a hydrocarbon based fuels such as gasoline, can exhibit the undesirable affect of discharging deleterious exhaust emissions or gases into the atmosphere. These exhaust gas emissions, prior to any predischarge treatment, usually contains environmentally unacceptable components as $NO_x$, CO and unburned hydrocarbons.

It can be appreciated when one considers the number of automobiles in daily service, that the amount of untreated engine exhaust gas which is delivered into the atmosphere is virtually immeasurable. In spite of the number of catalytic converters presently in service which treat the gas prior to its discharge, the volume which flows past cold catalyst beds and consequently remains marginally treated, is still considerable. In brief, the present issue of a clean atmospheric environment suggests future air quality problems on a worldwide basis. Nonetheless, each step, even though minor, toward limiting the daily rate of pollutant gases which enter the atmosphere, must be welcomed.

One common practice known and accepted commercially for treating exhaust gases prior to their release into the atmosphere, is to convert the gases into less noxious fumes. A widely used and successful treatment for hot exhaust gas which leaves an automobile or truck engine at a temperature of up to 2000° F., is to bring the gas into contact with an active catalyst to prompt the desired chemical conversion. This method is designed to receive and treat a steady flow of hot exhaust gas as it is being produced from an internal combustion engine.

Physically, even a brief contact between a heated catalyst material which should preferably be at least 700° to 900° F., and a stream of the engine exhaust gas, can be effective in achieving conversion of the gas into a less harmful condition. It is important to note however that this reaction, if utilized to its maximum potential, requires a preferred operating catalyst temperature in excess of about 900° F.

It is known, for example, that for initial startup of any lo engine equipped vehicle having a catalytic converter, the catalyst will, in all probability, not be at a sufficiently high temperature to be effective. Thus, for the first several minutes or miles of the engine's operation, exhaust emissions will enter the atmosphere only marginally treated.

During a cold engine's startup period, the engine's exhaust gas becomes progressively hotter as engine parts become heated. As the initially produced gas contacts the catalyst, the latter will likewise become gradually heated from ambient, to the temperature of the gas. During this initial or warm-up period however, there will be minimal, if any, reaction in converting the exhaust gas to a less noxious state since the temperature of the catalyst is too low to promote a reaction. Subsequent to the warm-up period, however, due to contact of the hot exhaust gas stream with the catalytic bed, the latter will be heated to a temperature at which it is capable of achieving maximum effectiveness.

BRIEF STATEMENT OF THE INVENTION

Toward minimizing the discharge of untreated exhaust gas into the atmosphere, there is here disclosed a means for preheating a catalytic converter in an exhaust gas treating system, prior to the catalyst being contacted by the exhaust gas stream and prior to startup of the engine. The converter itself is comprised essentially of a catalyst bed which is confined within a casing. An electrically activated heating element is positioned in heat exchange relation to the catalyst mass.

Heater operation prior to engine startup, is controlled by regulating a flow of electric energy from a power source such as a battery, to the heater element. Activation of the heater element is achieved through a triggering circuit capable of receiving and reacting to a remotely transmitted radio signal which, when received, closes the heater power circuit.

Subsequent to the catalyst reaching an acceptable operating temperature, the heating element becomes automatically disconnected from the electrical energy source. The way is then cleared for startup of the engine, and passage of hot exhaust gas through the exhaust treating system.

It is therefore an object of the invention to achieve a more acceptable and improved environment by minimizing the discharge of exhaust gas into the atmosphere.

A further objective is to provide means for thermally preparing an automotive exhaust gas treating system having a catalytic converter, in anticipation of engine startup, and introduction of said gas to the preheated catalyst.

DESCRIPTION OF THE DRAWINGS

As shown in FIG. 1, to illustrate the invention the disclosed exhaust gas treating system is incorporated into a vehicle 10 which is powered by an internal combustion engine 11.

Figure 1:
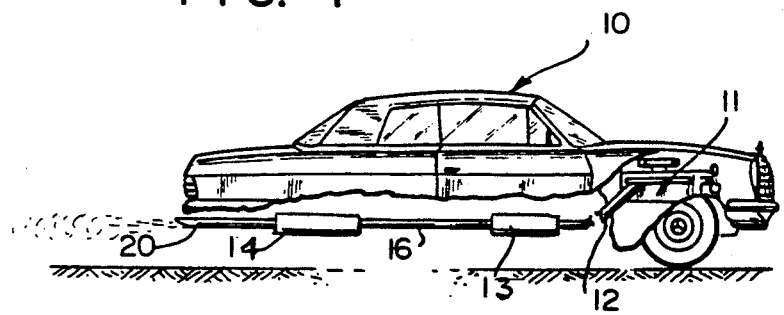
FIG. 1 is an environmental illustration of the disclosed system as embodied in an automotive vehicle.

The engine driven vehicle includes a forward mounted, gasoline or diesel fueled engine 11 as the primary automotive power source. Hot exhaust gas produced while the engine operates, is directed from the engine's exhaust manifold 15, into an exhaust header or conduit 12, and thereafter into a catalytic converter 13. From converter 13, a treated gas stream is introduced to the vehicle's muffler 14 by way of a conduit 16, then discharged into the atmosphere through the system's tail pipe 20.

Figure 2:
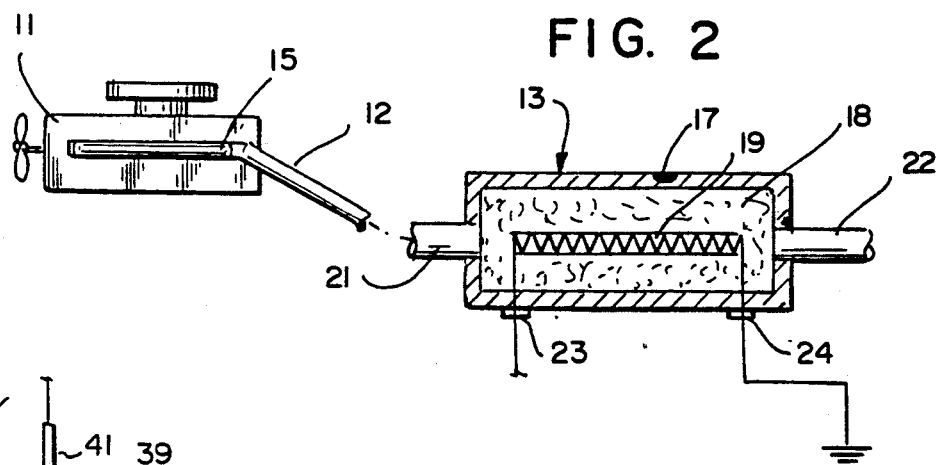
FIG. 2 is a view in partial cross section and on an enlarged scale, of a segment of FIG. 1.
Figure 3:
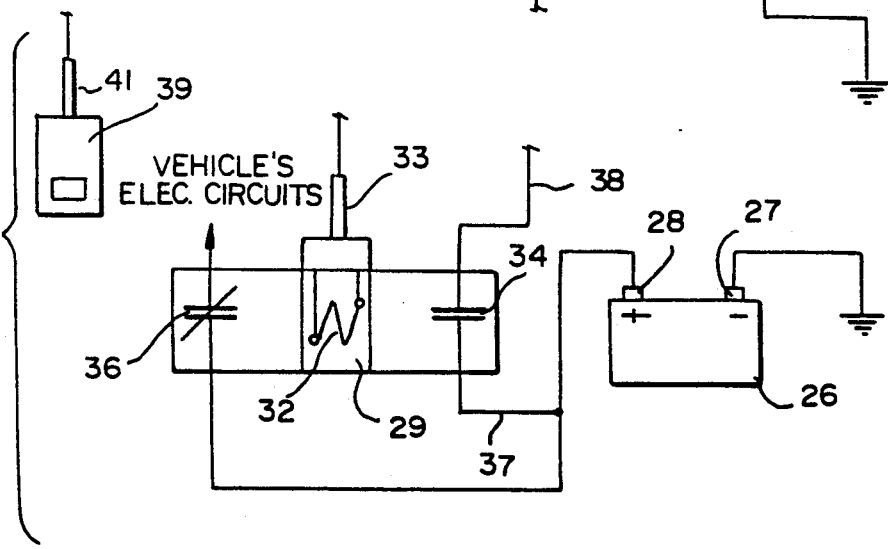
FIG. 3 is an illustration of electrical circuitry utilized in the system.

Referring to FIG. 2, in one embodiment, catalytic converter 13 is comprised of a metallic casing 17, generally oval or relatively flat in cross section, which encloses a catalyst material. The latter can embody a number of physical forms but is normally comprised of a gas permeable mass shaped into a bed 18. Associated with bed 18, a heating element 19 is positioned within casing 17 located in a manner to most effectively preheat catalyst bed 18 preliminary to a hot exhaust gas stream entering the converter.

Heater element 19 can take any one of several embodiments so long as it is in heat exchange association with the catalyst mass. It further includes at least 2 terminals 23 and 24 which extend through the wall of casing 17 to connect with an electrical power source. Casing 17 includes an inlet 21 at one end, which engages exhaust manifold or header 15 by way of conduit 12 to receive the stream of hot exhaust gas. A discharge or outlet port 22 at the casing 17 remote end releases a treated gas stream into conduit 16. The treated exhaust gas, now comprising a mixture of less noxious, or a more environmentally acceptable mixture of gases will flow through muffler 14 and thence pass into the atmosphere.

Heater element 19 is designed to become operative when powered by a convenient electrical energy or power source such as a 12 volt battery 26 usually associated with the vehicle's ignition system. The battery will normally be utilized to power other electrical systems such as the vehicle's head lights, trunk lock, door locks, wipers, etc. However, the battery will be used exclusively for catalyst preheating and is segregated from other systems when the vehicle's engine is not running.

Battery 26 is grounded through negative terminal 27. Positive terminal 28 is connected to heater terminal 23 through a control element 29. The latter can assume one of a number of forms to successfully regulate the function of the battery during the catalyst preheating period.

In one embodiment, the basic control means 29 includes a circuit closing element such as a relay having a coil 32. The latter is activated in response to a remotely transmitted signal received in a receiving circuit 31 not shown in detail but which includes antenna 33. The relay regulates the disposition of contacts 34 and 36 between open and closed conditions, to regulate the on and off status of the heater powering circuit.

Specifically, in closed position, contacts 34 will isolate and direct power from battery 26 exclusively to heater terminal 23 through cables 37 and 38. In the open or inactive state, contacts 34 will break or interrupt electrical energy flow between battery terminal 28, through cables 37 and 38 to terminal 23. Concurrently, contacts 36 in open position will disconnect all of the vehicle's electrical circuits which are energized by battery 26, until heater element 19 becomes disconnected from battery 26 by opening contacts 34.

Triggering the power circuit to initiate the catalyst preheating period is achieved through a remotely positioned and preferably hand carried transmitter or transceiver 39. Said unit will preferably have a function verification device such as an LED which will illuminate to verify that the particular function engaged by the operator has either been executed, or is in the process of execution. The LED will remain lighted until the function is completed.

To function most efficiently, transmitter 39 should have the capability of transmitting a radio signal through antenna 41 at a crystal controlled frequency that will be received by antenna 33. As a practical matter, transmitter 39 should have a sufficient range that the desired radio signal when transmitted from an operator's location such as his residence, will be received at antenna 33 which is normally located in a convenient position in the vehicle. The latter can be several hundred feet away from the operator as in a garage or in an external parking area.

Functionally, upon receiving a radio signal of specific frequency from transmitter 39, heater 19 will be activated by closing contacts 34 to gradually elevate catalyst bed 18 from ambient temperature to the catalyst's ideal operating temperature. During this preheating period, the vehicle operator can be walking toward the vehicle in preparation to starting up the engine.

Figure 4:
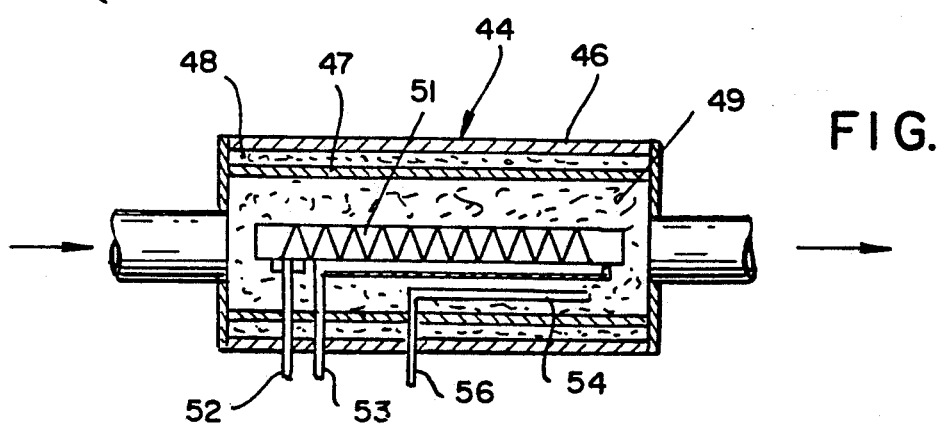
FIG. 4 is an alternate embodiment of the novel catalytic converter shown in FIG. 2.

Ideally the catalyst heating period will be of a sufficient time to raise catalyst bed 18 to its optimum temperature from its condition at ambient temperature. Thus, discontinuance of the catalyst preheating period is regulated to lapse within a set time interval. Alternately, and as shown in FIG. 4, said interval can be terminated by a temperature sensor, such as 43, associated with the catalyst converter 13 to monitor catalyst temperature. Sensor 43, although not shown in detail, will have the capability of discontinuing the preheating at such time as the desired catalyst temperature is achieved.

When the heater electrical energy flow is discontinued by inactivation of control element 29 through sensor 43, or a timer means, battery 12 will automatically become available for use in other circuits likewise triggered at transmitter 39, such as for starting the engine, unlocking the vehicle's doors by an operator a distance away from the vehicle.

To facilitate the catalyst preheating step, and to avoid draining battery 26 during the preheat period, the catalytic converter can be structured to minimize the possibility of its becoming run down and inoperative. The converter 44 therefore, can be fabricated as shown in the embodiment of FIG. 4. The unit thus comprises an outer casing 46 which surrounds, but is spaced from, an inner canister 47. The interwall spacing 48 therebetween is fabricated to form a thermal barrier. Although said space can be maintained unoccupied, alternately it can be filled with a thermal resistant or insulating material such as asbestos or glass fiber compositions.

Referring again to FIG. 4, catalytic bed 49 is closely associated with heater element 51 which in turn is accessed through terminals 52 and 53. Temperature control during the catalyst bed preheat period can be regulated by means of sensor 43 which is positioned to monitor the temperature of the bed during the preheat period. Sensor 43 includes a terminal connection 56 for connection with the heater control circuit. Thus, when catalyst bed 49 has been preheated to its preferred operating temperature, sensor 43 will function to electrically discontinue further heating and cause the battery to revert to its normal connection with other electrical circuits in the vehicle.

In an alternate embodiment of the invention, preheating of the catalyst can be achieved efficiently through effective use of a vehicle's ignition system power source, such as a 12-volt battery. It can further be exercised through a separate and distinct power source such as a battery apart from the ignition battery, which is dedicated solely to catalyst preheating.

More specifically, the control of catalyst preheating can be achieved through use of at least two power circuits. A primary power circuit functions to initiate heating of the catalyst by activation of the heater element when the catalyst is cold due to non-use. This situation is exemplified when a vehicle which has been idle through an extended period, such as overnight, or when it has been idle even briefly in a cold atmosphere.

To avoid excessive use of the preheating system with its resultant battery drain, a secondary or standby circuit functions to maintain the catalyst in a partially heated or warm condition. The catalyst will thus require only a minimal degree of subsequent heating to raise it to operating temperature of about 700° F. This standby procedure can be utilized most effectively when the vehicle's engine is stopped in anticipation of being restarted within a short time period.

Figure 5:
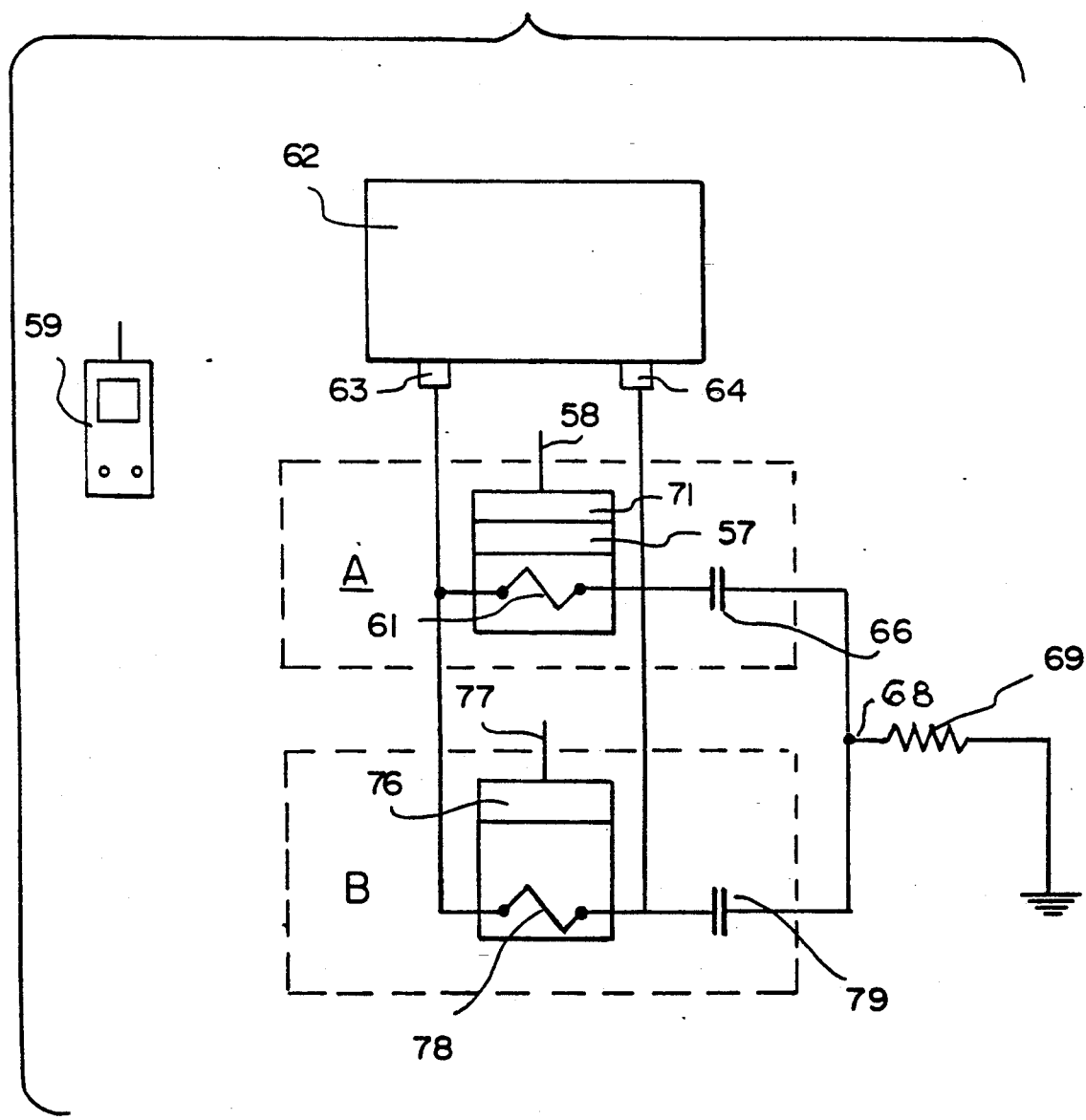
FIG. 5 is another embodiment of the heater circuitry.

Referring to FIG. 5, a schematic diagram of the system's electrical phase illustrates the catalyst preheating system utilizing dual power circuits A and B, which incorporate switching means to interconnect the circuits. Thus, each power circuit can be selectively connected individually, and to the exclusion of the other, to the 12-volt power source to activate the catalyst heater.

The two power circuits A and B are substantially similar, the notable exception being that standby circuit A is equipped with a timer which can be preset to discontinue heating of the catalyst bed after a desired time interval.

Each of the power circuits is further connected to, and is subject to a heat sensor in the catalyst bed. Thus, the temperature of the catalyst bed is monitored after reaching a predetermined operating level, and will trigger discontinuance of further electric heating when the hot exhaust gas is flowing.

As shown in FIG. 5, the standby or secondary power circuit A embodies a receiver 57 having an antenna 58, which receiver is calibrated through a crystal or similar frequency discriminator to be activated only by a signal at a particular frequency. The signal, as herein noted, can be initiated by a remotely positioned transmitter 59 which is likewise calibrated to transmit a signal on the desired standby frequency.

Receiver 57 is connected to a first actuating coil 61 which is connected to the electrical energy source, hereinafter referred to as battery 62. Actuation coil 61 is connected across terminals 63 and 64 of battery 62 to be energized in response to reception of a desired first frequency signal picked up by receiver 57. Activation of coil 61 closes contacts 66, which are connected through conductor 67 to the positive terminal 68 of heater element 69.

Power circuit A further includes a timer 71 which is connected to maintain first coil 61 in actuated condition only during a predetermined period. The timer, as noted, is preset depending on the length of time the vehicle's engine is anticipated to be idle and prevailing weather conditions.

When an operator leaves vehicle 10, having the intention of making a relatively short stop, the catalyst will not revert to its cold condition. The operator will thus activate the standby power circuit A at the remote transmitter 59. This will electrically connect heater 69 to battery 62 for a period determined by the setting of timer 71.

While the operator is away from vehicle 10, the heated condition of the catalyst will be maintained at a temperature level between about 300° and 400° F. Thereafter, when the vehicle's engine is to be restarted by switching to power circuit B, a substantially less heating time will be required before the catalyst is elevated to its operating temperature of about 700° F.

Physically, when the operator is about to return to the vehicle, remote transmitter 59 is adjusted preferably by a push button to initiate heating of the catalyst as heretofore noted. Since the catalyst is normally at an elevated temperature, although less than its desired operating temperature, the preheating period will be substantially limited.

During this final heating period, the primary power circuit B will be connected to the electrical energy source and standby power circuit A will be disconnected through the switching means which deactivates coil 61.

As a further improvement in the instant preheating system's efficiency, the switching means which selectively activates the various power circuits, can further control the engine ignition system. Thus, during the initial or maximum heating period the respective power circuits can effectuate a connection between the heater and the ignition system's battery together with the dedicated or second battery 62. Thereafter when the second battery 62 has discontinued its heater activating function, it will be reconnected into the vehicle's ignition system. The battery will thus be rejuvenated through the ignition system's generator.

Power circuit A for applying maximum heating to the catalyst, includes a receiver 76 having an antenna 77. The receiver is calibrated to receive a second frequency broadcast from remote transmitter 59. Receiver 76 will activate a second coil 78 whereby to close contact 79 and initiate energy flow to heater 69.

To achieve the necessary selective switching function, remote transmitter 59 includes means to automatically actuate one of power circuits A or B while disconnecting the other circuit.

When the catalyst has reached operating temperature, both circuits A and B will be deactivated and the electrical power source whether one or more batteries, will be reconnected to the engine ignition system for recharging.

As a practical matter, remote transmitter 39 can be adapted to regulate other functions on the vehicle such as unlocking the doors from a distance. Further, in the event of a malfunction in the remote transmitter, a supplemental heater triggering mechanism is provided. The latter will function to initiate catalyst heating by an appropriate switching arrangement inside the vehicle. Thus, catalyst preheating can be achieved by an operator through the vehicle's ignition system, while in the driver's seat.

It is understood that although modifications and variations of the invention can be made without departing from the spirit and scope thereof, only such limitations should be imposed as are indicated in the appended claims.

We claim:

1. In an exhaust gas treating system having a catalytic converter which includes a catalyst bed for contacting a hot exhaust gas stream, and an electrically energizeable heating element associated with said catalytic bed to preheat the bed to a desired operating temperature prior to contact of the bed with the hot exhaust gas stream, the improvement in said system for energizing said heater element in preparation for introducing the untreated hot exhaust gas stream to the catalytic bed which comprises:

a power circuit having a source of electrical energy, a signal responsive switching means in said power circuit being operable in response to receiving a transmitted signal to communicate said heater element to said source of electrical energy, means in said power circuit to segregate the source of electrical energy from other electrical circuits during said catalyst bed preheating period, means in said power circuit to limit the heater element energizing period to a predetermined time interval, temperature sensing means associated with said catalyst bed to limit the heating period to achieve a predetermined temperature range within said catalytic bed, said power circuit being further adapted to furnish electrical energy to a plurality of circuits through said signal responsive switching means.

2. A preheating system for a catalytic converter on a vehicle having an internal combustion engine and a battery powered ignition system, which catalytic converter includes a catalyst bed for contacting and treating a stream of exhaust gas prior to discharge of treated exhaust gas into the atmosphere, and an electrically energized heater means in heat exchange relationship with said catalyst bed for heating the latter, said preheating system comprising:

an electrical energy source, a first power circuit for connecting said heater means to said electrical power source, a second power circuit for connecting said heater means to said electrical energy source, and switching means interconnected to said respective first and second power circuits, to energize said heater means, being operable to selectively connect one of said first or second power circuits to said electrical energy source to the exclusion of the other of said power circuits.

3. In the apparatus as defined in claim 2, wherein said second power circuit includes timer means, being actuable after a lapse of a preset period to disconnect said second power circuit from the electrical energy source thereby to interrupt energizing of the heater means.

4. In the apparatus as defined in claim 2, including temperature sensing means in said catalytic bed connected to said first and second power circuits respectively, to interrupt energizing said heater means in response to said catalytic bed achieving a predetermined temperature.

5. In the apparatus as defined in claim 2, wherein said switching means includes a receiver means for selectively activating said respective first or second power circuits in response to receiving a predetermined signal.

6. In the apparatus as defined in claim 5, wherein said predetermined signal is a remotely transmitted radio signal.

7. In the apparatus as defined in claim 2, wherein said switching means includes means to electrically isolate said first and second power circuits from said ignition system.

8. In the apparatus as defined in claim 2, wherein said switching means is operable to selectively connect said first and second power circuits to the battery in said ignition system.

9. In the apparatus as defined in claim 2, wherein said switching means is operable to selectively connect said first and second power circuits concurrently to said battery and to said electrical energy source.

10. In the system as defined in claim 2, wherein said switching means is operable to connect said electrical energy source to said ignition system when neither of said first or second power circuits is selectively connected to said electrical energy source.

* * * * *